United States Patent [19]

Morawski

[11] 4,209,181
[45] Jun. 24, 1980

[54] INDEXABLE CHUCK

[76] Inventor: London T. Morawski, 15850 Common Rd., Roseville, Mich. 48066

[21] Appl. No.: 960,586

[22] Filed: Nov. 13, 1978

[51] Int. Cl.² .......................................... B23B 31/18
[52] U.S. Cl. ................................................ 279/5
[58] Field of Search ........................... 279/5, 6, 1 PC; 409/233, 231

[56] References Cited

U.S. PATENT DOCUMENTS

| | | | |
|---|---|---|---|
| 2,480,715 | 8/1949 | De Graff | 279/5 |
| 2,643,132 | 6/1953 | Hunziker et al. | 279/5 |
| 2,930,626 | 3/1960 | Sharp | 279/5 |
| 2,948,542 | 8/1960 | Leifer | 279/5 |
| 2,972,487 | 2/1961 | Blackburn | 279/5 |

Primary Examiner—William R. Briggs
Attorney, Agent, or Firm—Barnes, Kisselle, Raisch & Choate

[57] ABSTRACT

A chuck having a pair of opposed jaws reciprocable toward and away from each other to grip and release a workpiece and also rotatable incrementally about their axis of reciprocation to rotatably index a workpiece gripped by the jaws. The jaws are actuated by two axially reciprocable drawbars through two sets of cams, one set for reciprocating the jaws and the other for rotating them.

10 Claims, 13 Drawing Figures

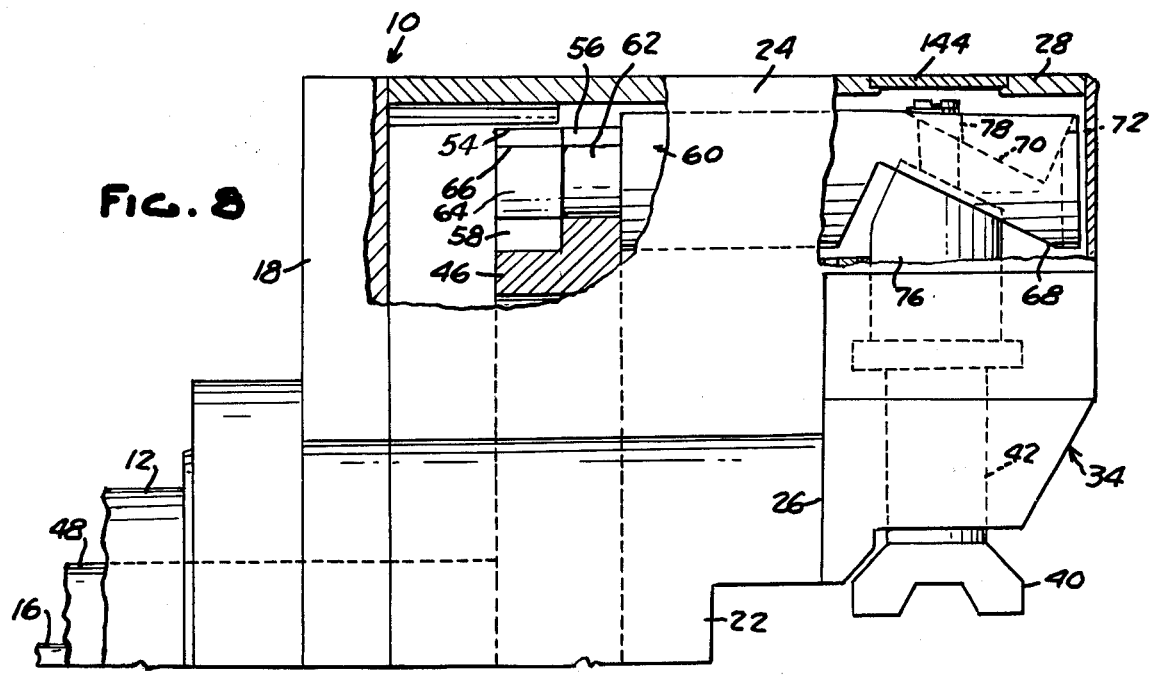
Fig. 8
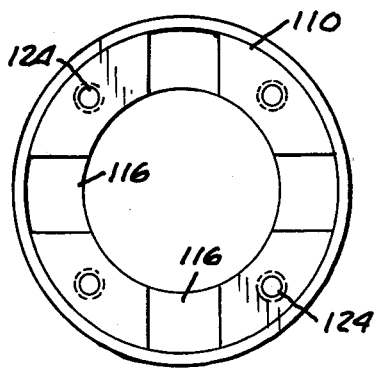
Fig. 10
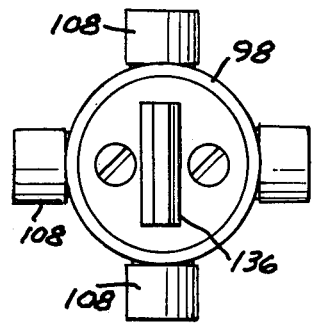
Fig. 9
Fig. 11
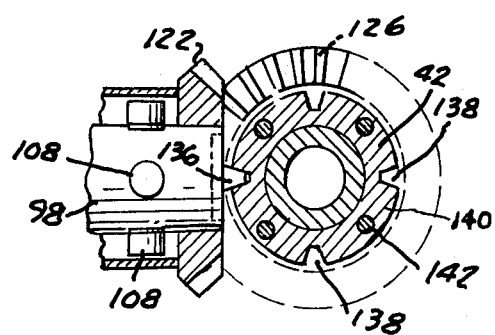
Fig. 12

INDEXABLE CHUCK

This invention relates to chucks, and, more particularly, to a chuck for indexing a workpiece about an axis perpendicular to the rotary axis of the chuck.

Frequently workpieces are designed with a plurality of projections or openings, the axes of which extend radially outwardly from the central axis of the workpiece. One such type of workpiece is the spider of a universal joint having four cylindrical projections spaced 90° apart circumferentially on axes which are perpendicular to the central axis of the spider. In order to machine the projections or openings on a workpiece of this type economically on a production basis it is desirable to support the workpiece in a chuck so that it can be indexed about its central axis to successively present each of the projections or openings thereon to the cutting tool.

The primary object of the present invention resides in the provision of a chuck of the type described which is capable of indexing a workpiece about a central axis on the workpiece through successive arcuate increments to enable machining holes or projections on the workpiece whose axes extend radially to the central axis of the workpiece.

A further object of this invention is to provide a chuck of the type described having a pair of jaws movable radially to grip and release a workpiece and which are also rotatable about their axes for rotatively indexing the gripped workpiece.

Another object of this invention is to provide a chuck having a pair of diametrically opposed jaws arranged to both reciprocate radially and to rotate about their axes of reciprocation by means of a pair of telescopically arranged drawbars within the machine tool spindle on which the chuck is mounted.

A still further object of the present invention resides in the provision of a chuck of the type described which is compact, of rigid construction, and reliable in operation.

Other objects, features and advantages of the present invention will become apparent from the following description and accompanying drawings, in which:

FIG. 8 is a fragmentary side elevational view, partly in section, of the chuck showing the jaws in the retracted position;

FIG. 9 is an end view of one of the cam follower carriers;

FIG. 10 is an end view of one of the jaw indexing cams;

FIG. 11 shows the cam track of the cam shown in FIG. 10 laid out in the flat;

FIG. 12 is a sectional view along the line 12—12 in FIG. 1; and

Figure 1:
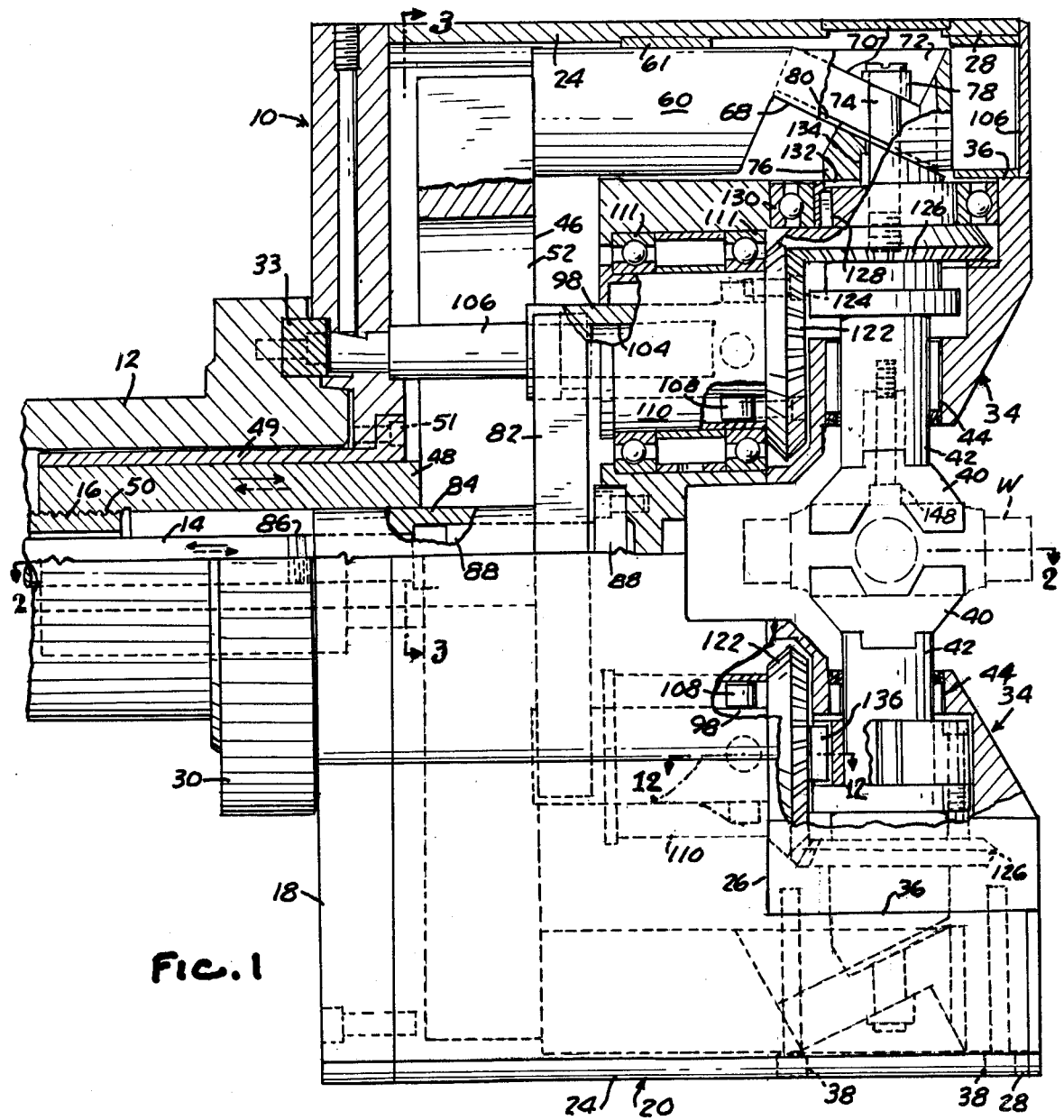
FIG. 1 is a side elevation partially in section of a chuck according to the present invention.
Figure 2:
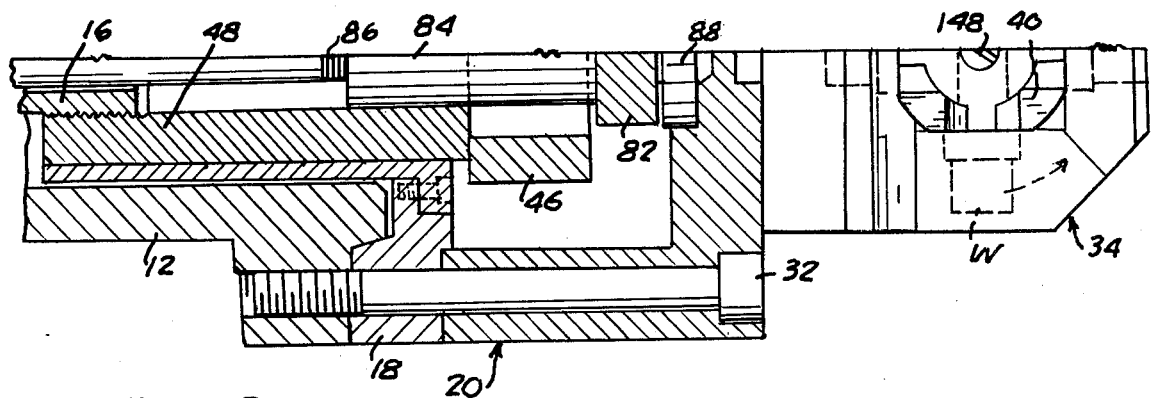
FIG. 2 is a fragmentary sectional view along the line 2—2 in FIG. 1.
Figure 3:
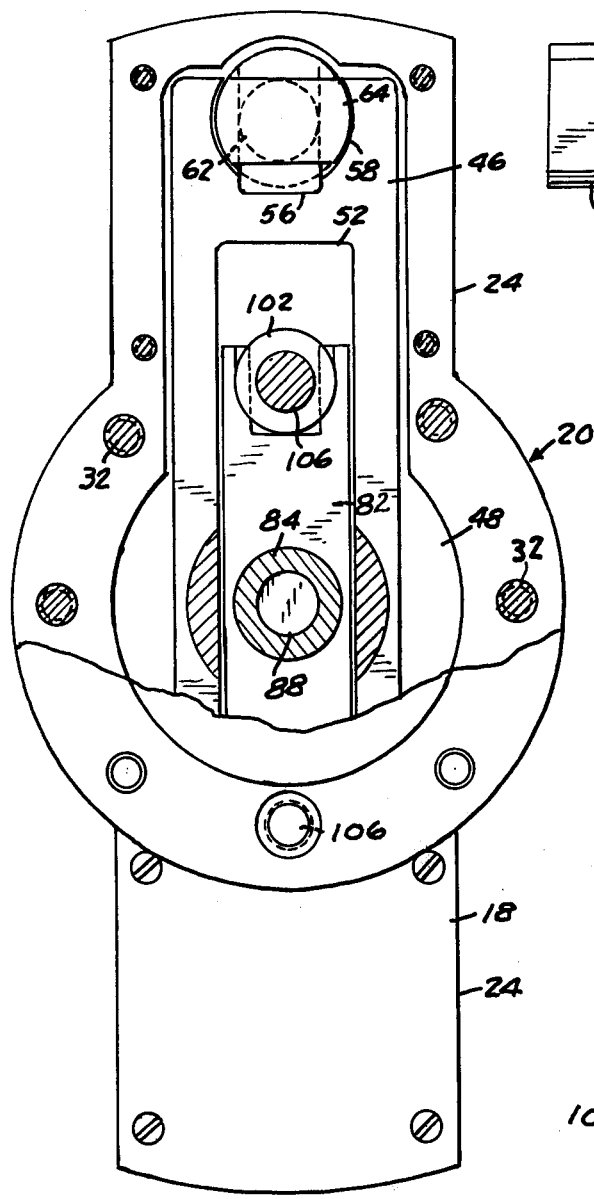
FIG. 3 is an elevational view of the chuck, partly in section, as viewed from the back or spindle end thereof.
Figure 13:
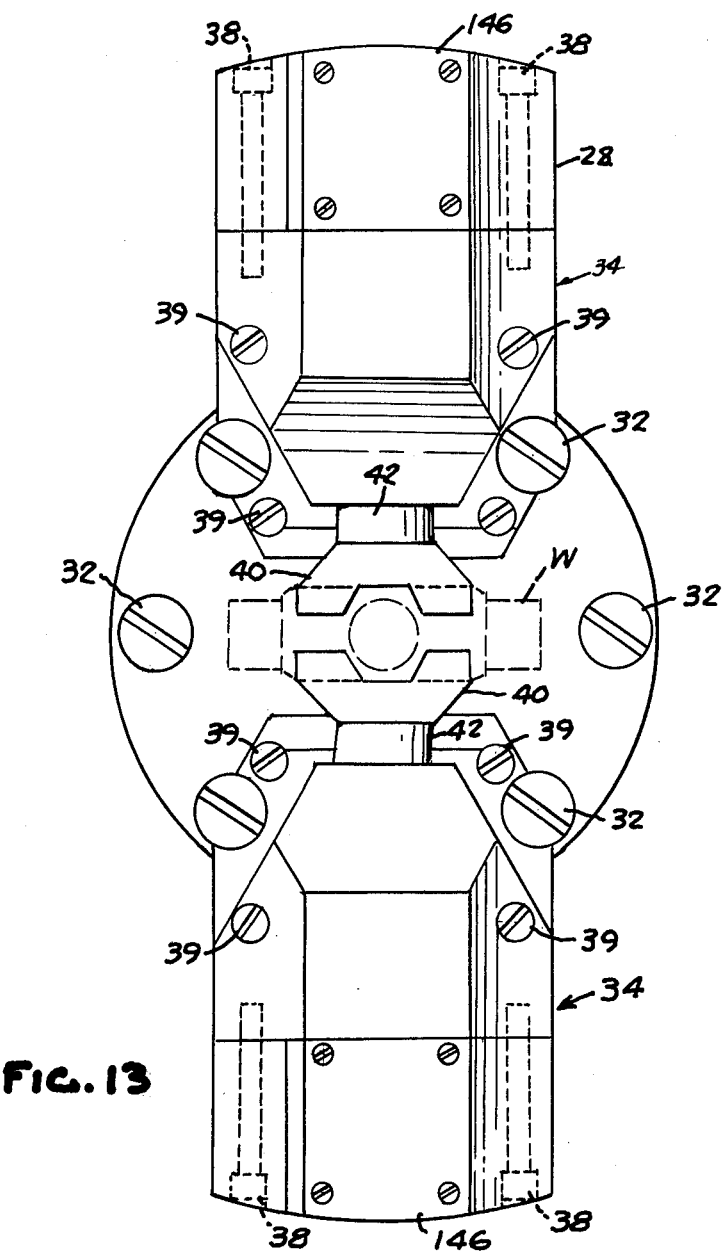
FIG. 13 is an end view of the chuck as viewed from the front end thereof.

Referring to FIG. 1, the chuck of this invention, which is generally designated 10, is adapted to be mounted on the rotary driven spindle 12 of a machine tool. The machine tool is of a conventional type having an inner drawbar 14 and an outer drawbar 16 telescopically engaged one within the other and which extend axially through spindle 12. Drawbars 14,16 are arranged to be independently reciprocated axially and rotated in unison with spindle 12. The chuck 10 includes a spindle adapter 18 on which is mounted the main housing 20 of the chuck. As shown in FIGS. 1, 3 and 13, adapter 18 and housing 20 have a generally circular central portion 22 and a pair of diametrically opposite, radially outwardly extending leg portions 24. The leg portions 24 of housing 20 extend axially forwardly beyond the front face 26 of the circular portion of the housing as at 28. Adapter 18 and housing 20 are secured to the mounting flange 30 of spindle 12 by screws 32 and a drive lug 33. Jaw housings 34 are mounted on the radially inner faces 36 of extensions 28 by means of screws 38 and against the front face 26 by screws 39 (FIG. 13). A pair of diametrically opposite jaws 40 are mounted on the inner ends of jaw spindles 42. Spindles 42 are journalled for rotation in housings 34 by bearings 44. As described hereinafter, spindles 42 are also reciprocable axially toward and away from one another.

Figure 4:
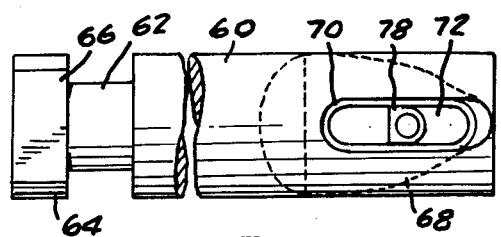
FIG. 4 is a plan view of one of the clamping puller shafts forming part of the jaw clamping assembly.
Figure 5:
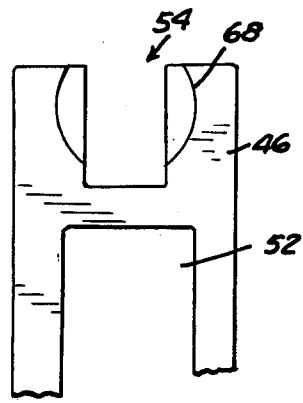
FIG. 5 is a fragmentary elevational view of the clamping puller plate.
Figure 7:
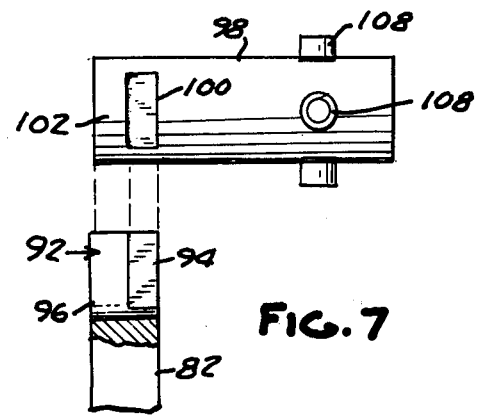
FIG. 7 is an exploded fragmentary view of the assembly of the index puller plate with the cam follower carrier.
Figure 6:
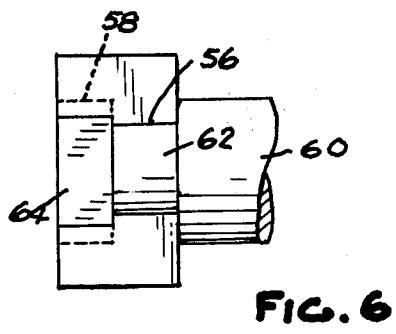
FIG. 6 is a fragmentary plan view of the assembly of a clamping puller shaft with the puller plate.

Within housing 20 there is arranged a generally rectangularly shaped clamping puller plate 46 (FIGS. 1 and 3). At the central portion thereof puller plate 46 is connected as by welding to a sleeve 48 having a threaded connection as at 50 with the outer drawbar 16. Sleeve 48 is axially slideable in a bushing 49 secured to adapter 18 by screws 51. Puller plate 46 has an elongated through opening 52 extending throughout a major portion of its length. At its opposite ends puller plate 46 is formed with outwardly opening sockets 54. Sockets 54 are defined by a longitudinal slot 56 on the front face of plate 46 and a cylindrical cavity on the rear face of plate 46. Sockets 54 are designed to receive the rear ends of clamping puller shafts 60 which are arranged within the housing for axial reciprocation within bearing sleeves 61. Adjacent their rear ends shafts 60 are formed with a reduced cylindrical neck 62 and an enlarged head 64 having flats 66 on the opposite sides thereof. Referring to FIGS. 4, 5 and 6, it will be observed that shafts 60 are adapted to be interconnected with puller plate 46 by introducing the heads 64 axially into the slots 56 from the front face of plate 46 and, thereafter, rotating the shafts 90° so that the head 64 will engage the cylindrical cavity 58 behind the slotted section 56. When the shafts 60 are thus interengaged with sockets 54 they are fixed to puller plate 46 and constrained to slide axially within bearing sleeves 61 in response to reciprocation of puller plate 46.

Adjacent their forward ends each shaft 60 is formed with axially extending cam surfaces 68,70 on the radially inner and outer sides thereof. As shown in FIGS. 1 and 8, cam surfaces 68,70 are parallel and inclined radially inwardly in a forward direction. A slot 72 extends vertically through cam surfaces 68,70 and accommodates a screw 74. Screws 74 are threaded into the radially outer ends of spindles 42 and retain inner and outer cam shoes 76,78 in engagement with cam surfaces 68,70, respectively. As shown in FIGS. 1 and 8, the cam surfaces of shoes 76,78 are in coplanar engagement with cam surfaces 68,70 and cam shoe 76 is prevented from rotating relative to shaft 60 by means of a keyway 80. Cam shoe 78 engages the side walls of slot 72 above cam face 70 (FIG. 4).

With the arrangement thus far described it will be observed that when the outer drawbar 16 within spindle 12 is retracted to the position shown in FIG. 1 cam shoe 76, by reason of its engagement with the cam surface 68, is displaced radially inwardly and, thus, the two jaws 40 are brought into gripping engagement with the workpiece W. Likewise, when the outer drawbar 16 is shifted forwardly interengagement of cam shoe 78 with cam surface 70 will cause the two spindles 42 to be displaced radially outwardly and, thus, allow the two jaws 40 to release the workpiece.

Referring now to FIGS. 1 and 3, an indexing puller plate 82 is aligned radially with clamping puller plate 46 and is connected at its central portion to a sleeve 84 as by brazing. Sleeve 84 is slideable axially within sleeve 48 and is connected as at 86 to the inner drawbar 14. Sleeve 84 is guided for axial movement on a pilot shaft 88, the flanged end of which is secured as by screws 90 to the central portion of housing 20. At its opposite ends indexing puller plate 82 is formed with radially outwardly opening sockets 92 which, on the front side of plate 82, are defined by straight sided narrow slots 94 and on the rear side of plate 82 by cylindrical cavities 96. Sockets 92 are adapted to be interengaged with the inner ends of cam follower carriers 98 which are in the form of cylindrical shafts having flats 100 formed on radially opposite sides thereof and dimensioned to be inserted in a radially inward direction into the slots 94. When so inserted the cylindrical rear ends 102 of carriers 98 interengage with the cylindrical cavities 96 of plate 82 and, thus, form a rigid axial connection between carriers 98 and plate 82 that prevents rotation of carriers 98 relative to plate 82. Slot 56 in clamping puller plate 46 is dimensioned so that when inner drawbar 14 is retracted the index puller plate 82 is adapted to nest therein.

Carriers 98 are formed with an axially extending bore 104 by means of which the carriers are slideably guided on pins 106. Pins 106 are fixedly mounted in adapter 18 as shown in FIG. 1 and extend forwardly through the opening 52 in clamping puller plate 46. At their forward ends each carrier 98 has journalled thereon four cam follower rollers 108. Rollers 108 are arranged as two perpendicularly related pairs, the rollers in each pair being diametrically opposite one another. Rollers 108 engage within cam tracks in barrel cams 110 which are journalled for rotation in housing 20 by bearings 111. The cam tracks extend around the inner periphery of cams 110 and as shown in FIG. 11 comprise four sets of angularly intersecting zig-zag cam tracks 112,114 and four sets of axially extending cam tracks 116, 118. Cam tracks 116 extend forwardly from the intersections between cam tracks 114,116 at one end thereof and cam tracks 118 extend rearwardly from the intersections of cam tracks 114,116 at the other end thereof. It will be observed that the intersecting points 120 of cam tracks 112,114 are slightly offset circumferentially in one direction from the respectively axially extending cam tracks 116,118. This cam track arrangement is such that when carrier 98 is shifted rearwardly from its forwardly advanced position shown in FIG. 1 the cam follower rollers 108 are displaced along the cam tracks 116 into engagement with cam tracks 114 and then into cam tracks 118 to rotate the cams one-eighth of a revolution. When the carriers 98 are shifted forwardly from their retracted position the cam followers 108 are displaced forwardly along cam tracks 118,112,116 to again rotate each barrel cam one-eighth of a revolution in the same direction. Thus, for each complete reciprocating stroke of carriers 98 the two barrel cams 110 are rotated through one-quarter of a revolution. The cam tracks in the two cams are reversely positioned so that the cams are rotated simultaneously in opposite directions.

A bevel pinion gear 122 is secured to the forward end of each barrel cam 110 by screws 124. Gears 122 mesh with similar bevel gears 126 which are keyed as at 128 to the jaw spindles 42 and which are journalled in the jaw housings 34 by bearings 130. The keys 128 provide a rotary driving connection between gears 126 and jaw spindles 42 and, at the same time, permit the jaw spindles to reciprocate axially through the gears. Since the clamping force is applied to the jaw spindles by cam shoes 76, a bearing 132 is provided between each cam shoe 76 and the upper end of its respective spindle 42 and a bearing 134 is provided between each cam shoe 76 and its respective holding screw 74 (FIG. 1). One of the cam follower carriers 98 (the one shown at the lower half of FIG. 1) has a wedge-shaped shot pin 136 fixedly mounted on the forward end thereof. When the jaw carrier is in its forwardmost position shot pin 136 is adapted to interengage with one of a plurality of four circumferentially spaced slots 138 on an index ring 140 mounted by screws 142 on the hub of the adjacent bevel gear 126 (FIG. 12). The interlock between shot pin 136 and a slot 138 in ring 140 assures the proper and accurate indexing of jaws 40.

The provision of jaw housings 34 separate from the main housing 20 of the chuck facilitates its assembly and servicing. As is shown in FIG. 1, the axial extensions 28 of the main housing 20 have removable caps 144 aligned radially with screws 74 to permit removal of the screws from the jaw spindles. Likewise, as shown in FIGS. 1 and 13, these extensions 28 have removable cover plates 146 on the front faces thereof which are axially aligned with and sufficiently large to accommodate clamping puller shafts 60. When screws 74 are removed each jaw housing 34 and the jaw assembly mounted therein can be removed from the main housing. Thereafter, when cover plates 146 are removed, shafts 60 can be rotated 90° and withdrawn axially from engagement with puller plate 46 through the forward ends of extensions 28. The remainder of the chuck mechanism is readily accessible for servicing by removing the main housing 20 from the spindle adapter 18.

In the course of production if it is desired to machine a similar workpiece of different size, the jaws 40 can be removed from spindles 42 by loosening screws 148 which secure the jaws to the screws. If necessary, another set of puller shafts 60 and shoes 76,78 can be substituted by removing the jaw housings as described. Furthermore, it will be noted that the nested arrangement of the two puller plates 46,82 appreciably reduces the required axial dimension of the chuck.

I claim:

1. A workpiece gripping chuck for use on a machine tool having a power driven rotary spindle and telescopically engaged inner and outer drawbars which rotate with the spindle and which are independently axially reciprocable along the rotary axis of the spindle comprising, a housing adapted to be mounted on the spindle to rotate therewith, a pair of diametrically opposed, radially extending jaws mounted on said housing for radial reciprocation toward and away from each other to grip and release a workpiece and also for rotary indexing movement about their axis of reciprocation to rotatably index the gripped workpiece about an axis perpendicular to the rotary axis of the spindle, a pair of parallel puller shafts axially reciprocable in said housing along axes parallel to the rotary axis of the spindle, a puller plate in said housing fixedly connected at its central portion with one of said drawbars, said puller plate having a pair of diametrically opposed end portions connected one with each of said puller shafts, each jaw including a jaw spindle extending radially of the rotary axis of said housing and a jaw member fixed on the radially inner end of each jaw spindle, means journalling each jaw spindle for rotation about its longitudinal axis, each spindle being axially slidable in said housing, a cam on each shaft having a cam face inclined to the axis of the shaft and a cam follower on each jaw spindle engageable with said cam face, each cam face being substantially flat and said cam follower comprising a shoe having a flat face in coplanar engagement with said cam face, each jaw spindle being rotatable relative to the shoe thereon, and means responsive to reciprocation of the other drawbar to rotatably index the jaws.

2. A chuck as called for in claim 1 wherein each cam has a pair of opposed parallel cam faces, the cam faces in each pair being generally flat and inclined radially to the rotary axis of said housing, each cam follower shoe having a pair of generally flat faces each engaging a respective cam face on the shaft, said jaw spindle being rotatable relative to said shoes to enable the shoes to remain in coplanar engagement with the flat cam faces on the shafts when the jaw spindles are rotated.

3. A chuck as called for in claim 2 wherein the radially inclined cam faces on each shaft are disposed one on the radially outer side of the shaft and the other on the radially inner side of the shaft, each shaft having a through slot therein extending axially of the shaft and between the cam faces thereon, and threaded means extending through said cam shoes and said slots securing each pair of cam shoes on its respective jaw spindle for rotation relative thereto.

4. A chuck as called for in claim 3 including a pair of access openings on the outer periphery of said housing in radial alignment with said securing means for the cam shoes to enable disconnecting the cam shoes from the jaw spindles.

5. A chuck as called for in claim 4 wherein said housing has a pair of access openings in the front face thereof aligned axially one with each of said shafts and sufficiently large to accommodate removal of the shafts through the last-mentioned openings.

6. A chuck as called for in claim 5 including a housing for each jaw spindle mounted on said first-mentioned housing and removable therefrom by radial inward displacement.

7. A chuck as called for in claim 6 wherein each puller shaft is adapted to be disconnected from the clamping puller plate by rotating the shaft about its longitudinal axis whereby, after the cam shoes are disconnected from said jaw spindles and the jaw spindle housings are removed, the puller shafts may be rotated and withdrawn axially from the first-mentioned housing through the access openings aligned with said shafts.

8. A workpiece gripping chuck for use on a machine tool having a power driven rotary spindle and telescopically engaged inner and outer drawbars which rotate with the spindle and which are independently axially reciprocable along the rotary axis of the spindle comprising, a housing adapted to be mounted on the spindle to rotate therewith, a pair of diametrically opposed, radially extending jaws mounted on said housing for radial reciprocation toward and away from each other to grip and release a workpiece and also for rotary indexing movement about their axis of reciprocation to rotatably index the gripped workpiece about an axis perpendicular to the rotary axis of the spindle, means responsive to reciprocation of one of said drawbars to reciprocate the jaws radially to clamp and release a workpiece, each jaw comprising a radially extending jaw spindle having a jaw fixed to the radially inner end thereof, a pair of barrel cams, one for each jaw spindle, rotatable about axes parallel to the rotary axis of the housing in response to axial reciprocation of the other drawbar, cam followers engaging said barrel cams and operatively connected with said other drawbar for axial movement therewith, gear means connecting each barrel cam with a respective spindle, said barrel cams being rotatable in response to displacement of said cam followers in a direction axially of the housing.

9. A chuck as called for in claim 8 wherein said gear means comprises a first pair of gears connected one to each of said barrel cams to rotate therewith and a second pair of gears journalled in said housing and meshing with the first gears, said jaw spindles being keyed to said second gears to rotate therewith and being slideable axially therethrough.

10. A chuck as called for in claim 9 wherein said barrel cams comprise cylindrical sleeves journalled for rotation in said housing and having cam tracks around the inner periphery thereof, said cam tracks engaging said cam followers so that when said other drawbar is reciprocated through one complete stroke the jaw spindles are rotated through a predetermined angular extent.

* * * * *